No. 718,866. PATENTED JAN. 20, 1903.
W. P. NORTON.
CHANGE SPEED ATTACHMENT FOR MILLING MACHINES.
APPLICATION FILED JAN. 24, 1902.
NO MODEL. 4 SHEETS—SHEET 1.
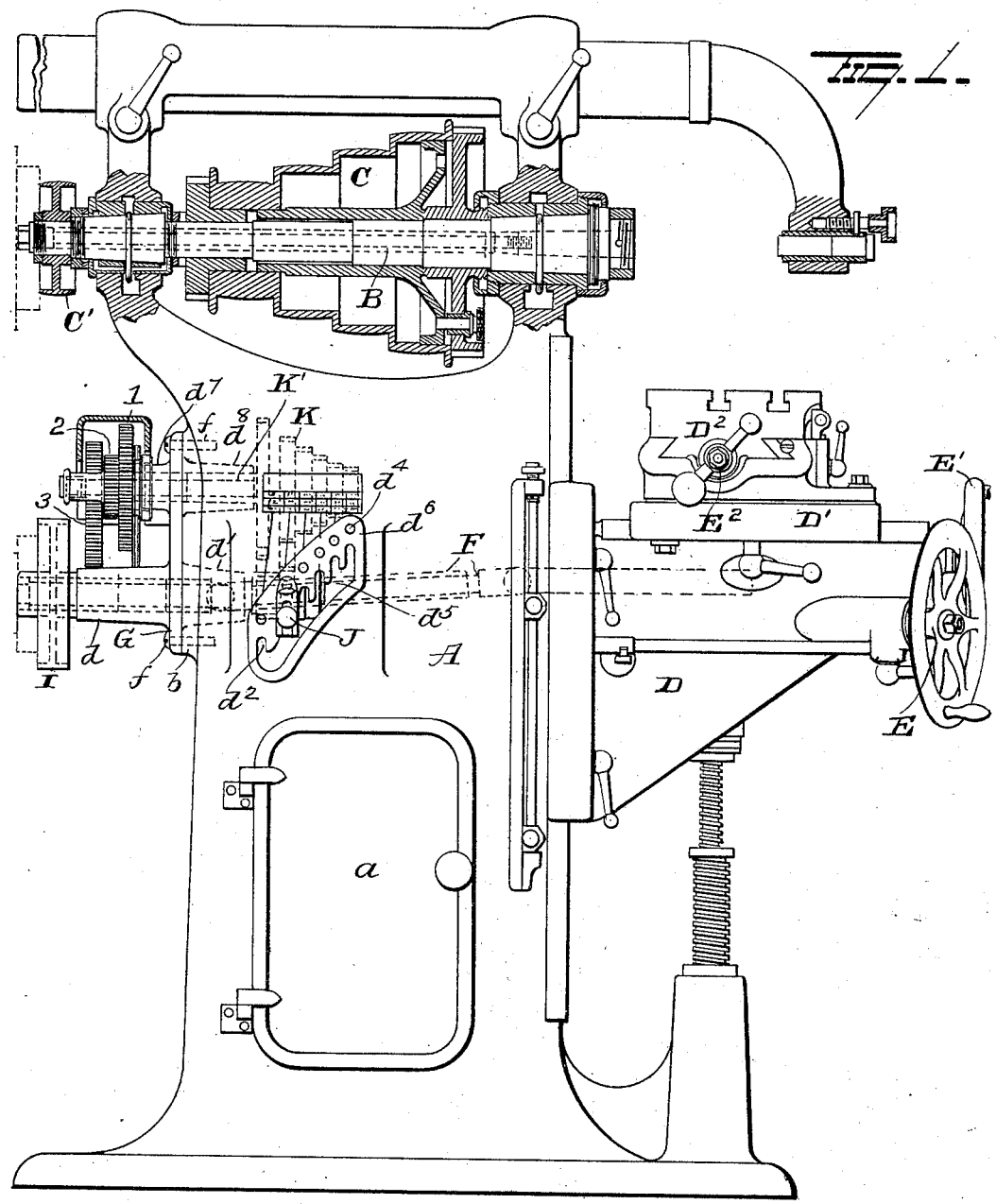

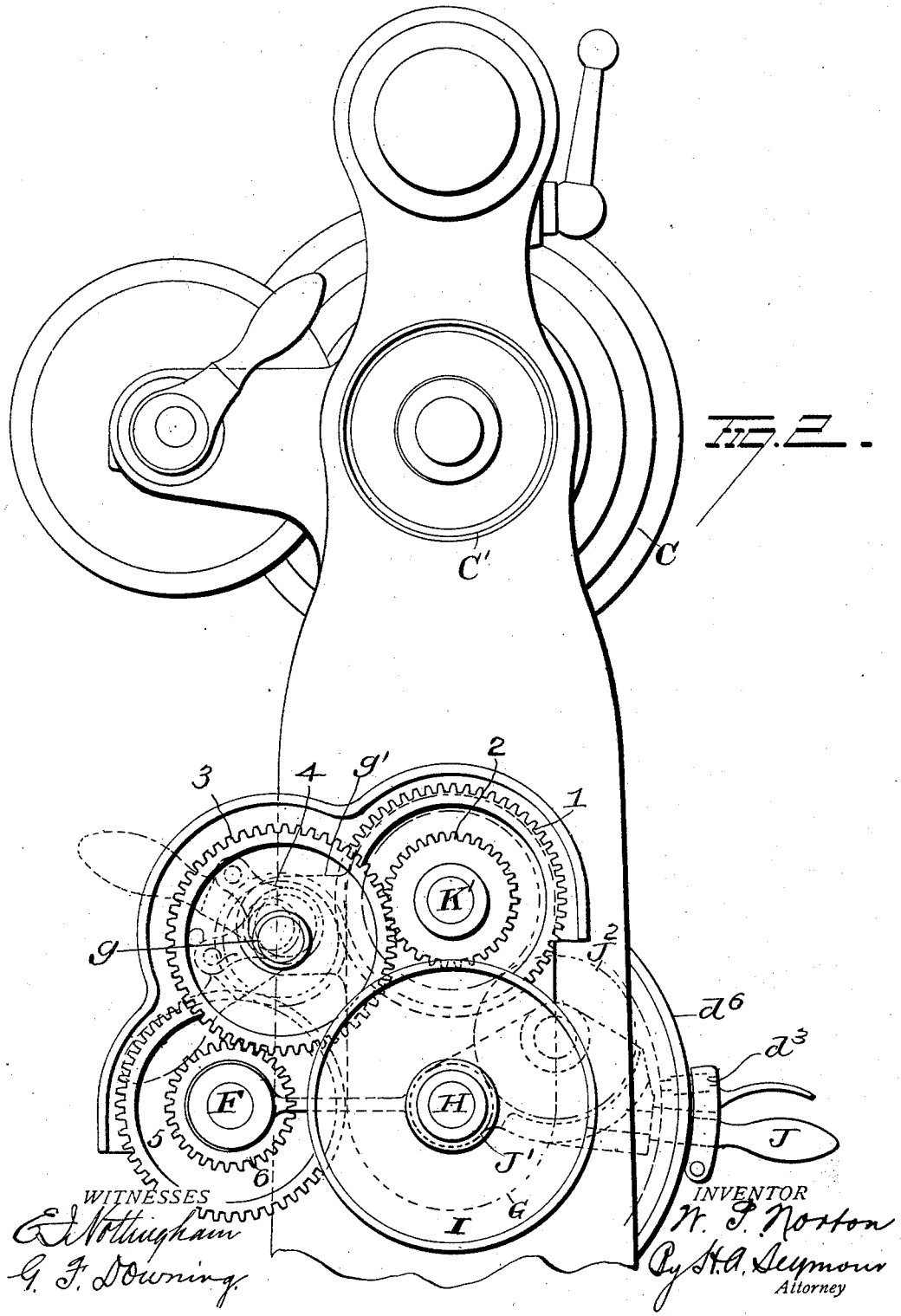

No. 718,866. PATENTED JAN. 20, 1903.
W. P. NORTON.
CHANGE SPEED ATTACHMENT FOR MILLING MACHINES.
APPLICATION FILED JAN. 24, 1902.
NO MODEL. 4 SHEETS—SHEET 3.
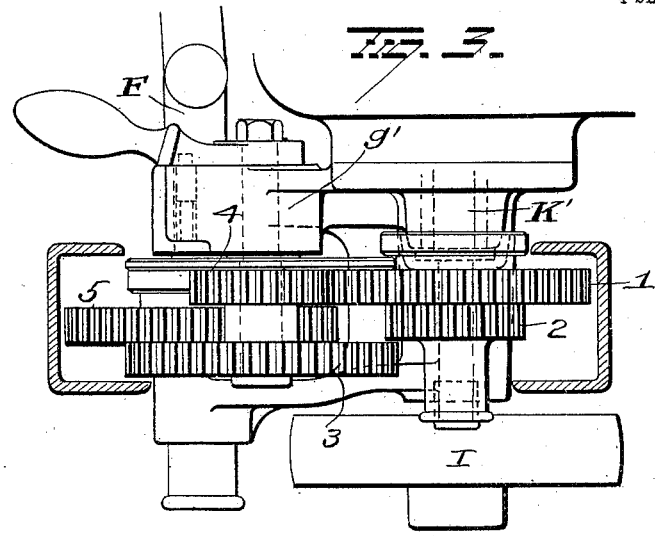
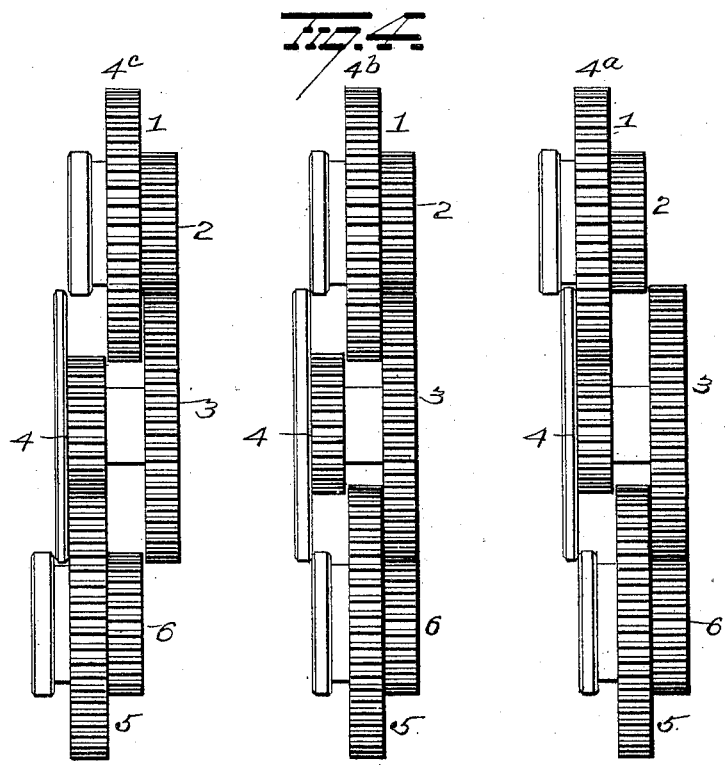
WITNESSES
E. I. Nottingham
G. F. Downing
INVENTOR
W. P. Norton
By H. A. Seymour
Attorney

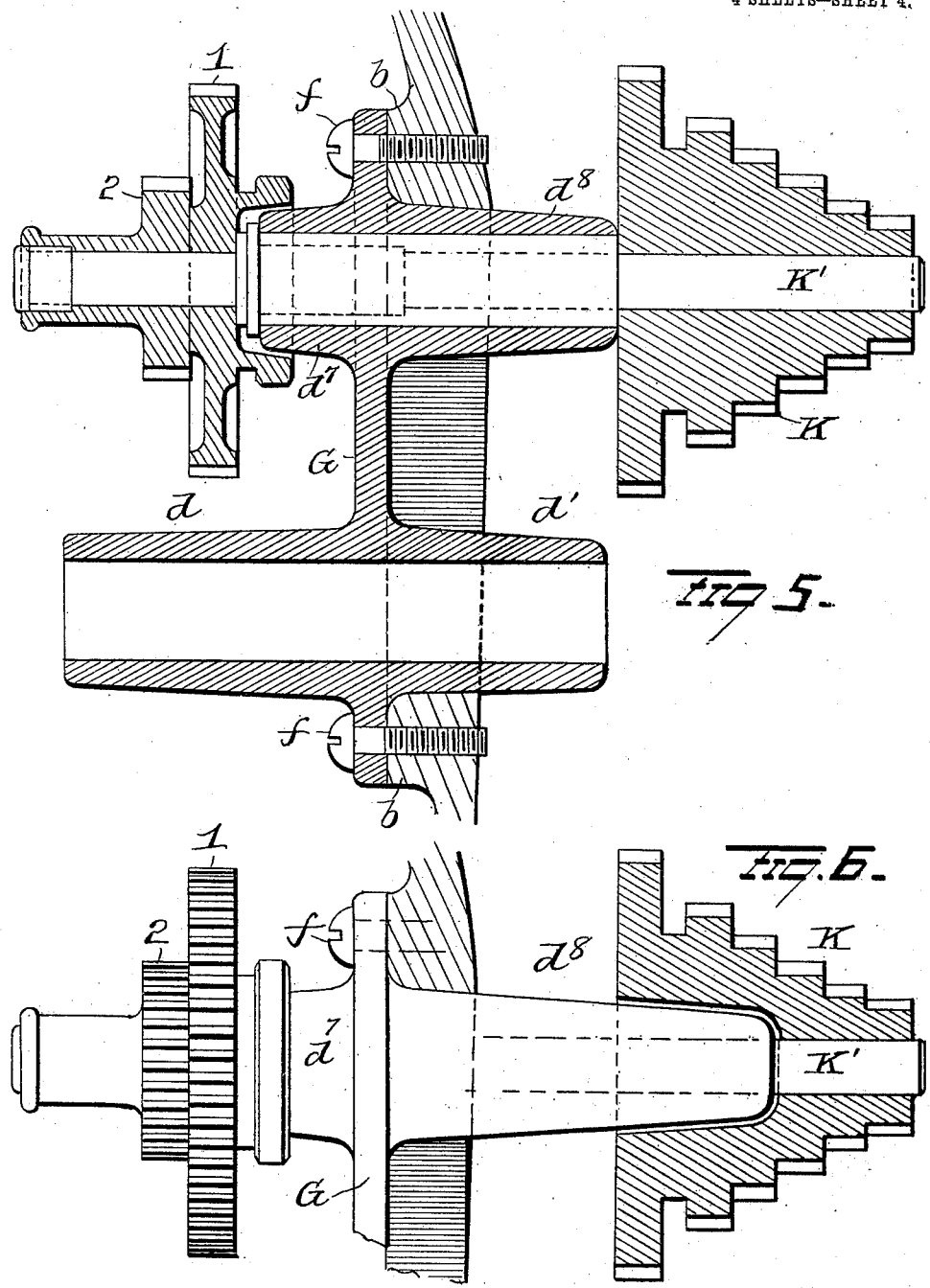

UNITED STATES PATENT OFFICE.

WENDELL P. NORTON, OF TORRINGTON, CONNECTICUT.

CHANGE-SPEED ATTACHMENT FOR MILLING-MACHINES.

SPECIFICATION forming part of Letters Patent No. 718,866, dated January 20, 1903.

Application filed January 24, 1902. Serial No. 91,044. (No model.)

*To all whom it may concern:*

Be it known that I, WENDELL P. NORTON, of Torrington, in the county of Litchfield and State of Connecticut, have invented certain new and useful Improvements in Change-Speed Attachments for Milling-Machines; and I do hereby declare the following to be a full, clear, and exact description of the invention, such as will enable others skilled in the art to which it appertains to make and use the same.

My invention relates to an improvement in change-speed attachments for milling-machines, the object being to provide an attachment whereby the speed of the lateral feed-screw in an out-feed and up-and-down feed of machine-table may be varied at pleasure; and with this end in view my invention consists in the parts and combinations of parts, as will be more fully described, and pointed out in the claims.

In the accompanying drawings, Figure 1 is a view in side elevation of a machine embodying my invention. Fig. 2 is a view in end elevation of the upper portion of same, showing the change-speed gearing. Fig. 3 is a plan view of the change-speed gearing. Fig. 4 represents diagrammatically three views $4^a$, $4^b$, and $4^c$ of the change-speed gearing. Fig. 5 is a view in section of the cone-gear, showing the manner of mounting same; and Fig. 6 is a similar view of a modification.

A represents the hollow bed or frame of the machine, provided near its base with the hinged door $a$, through which access may be had to the interior thereof. Mounted in the upper end of the bed or frame is the live-spindle B, carrying the pulley-cone C and driving-pulley C', and on the front is the milling-machine knee D. This knee D is adapted to be fed up and down. The carriage D' on the knee has an in-and-out feed, while the milling-machine table $D^2$ has a lateral movement on the carriage. These several movements are imparted to the feed-screws E, E', and $E^2$ by the universally-jointed and telescopic shaft F. (Shown in dotted lines in Fig. 1.)

The features thus far described, together with the mechanism within the knee for feeding the knee, carriage, and table, are old in the art; and my improvement consists in the construction and details of the mechanism for changing or varying the speed of movement of these parts.

The bed or frame A is provided on its rear side with an opening surrounded by a flange $b$, on which is seated the plate G, which latter carries the bearings or sleeves in or on which are mounted the speed-changing devices. Integral with this plate G is the inwardly and outwardly projecting hollow bearing or sleeve $d$ $d'$, in which is mounted the tumbler-shaft H, the latter being unsupported at its ends. Secured to the outer end of the tumbler-shaft is the belt-pulley I, which receives motion through a belt from the driving-pulley C' on the spindle B, and mounted on the shaft H within the base or frame A is the sliding tumbler-lever J, sliding pinion J', and tumbler-gear $J^2$. (Shown in Fig. 2.) This tumbler-lever is mounted on the shaft H so as to slide thereon and permit the shaft to freely revolve therein, and it embraces the sliding pinion J' (which is keyed to the shaft H so as to revolve therewith) and carries the tumbler-gear $J^2$, which is always in mesh with the sliding pinion. The tumbler-lever J passes through the inclined slot $d^5$ in the face-plate $d^6$ on frame A and is adapted to be moved into any one of the vertical slots $d^2$ in said face-plate and be locked by the latch $d^3$ entering one of the holes $d^4$ in the face-plate. Each vertical slot $d^2$ corresponds with a gear of the cone. Hence when the lever with its sliding pinion and tumbler-gear are moved from one slot to another the speed of rotation of the parts carried by the knee D is changed.

The step or cone gear K is secured on the shaft K', mounted in the inwardly and outwardly projecting bearings or sleeves $d^7$ $d^8$, also integral with the plate G. The inner bearing or sleeve $d^8$ may extend to or stop short of the largest gear of the cone, or it may, as shown in Fig. 6, project into the cone, the recess in the cone being sufficiently large for the reception of the sleeve without making contact with the same.

The plate G is removably secured to the base or frame A by screws $f$. Hence it will be seen that by removing the plate G the speed-changing mechanism thus far described can be removed bodily from the machine.

The cone-shaft K' passes through the bearings on the plate G and carries at its other end the integral pinions 1 and 2, both of which are keyed to the shaft K' and are capable of being slid a limited distance thereon, for a purpose that will be hereinafter explained. Mounted on an eccentric stud g, carried by an arm g', projecting from the rear edge of plate G, are the integral pinions 3 and 4, the smaller of which is designed to engage the larger pinion 1, while the larger pinion 3 is adapted to engage the smaller pinion 2. The pinions 3 and 4 are mounted on a movable eccentric stud, so as to permit the pinions 3 and 4 to be disengaged from the balance of the train when it becomes necessary to shift one or both pairs of twin pinions for the purpose of changing the combination for producing a change in the speed.

Slidingly mounted on the driven shaft F, which, as before stated, is made up of sections some of which are connected telescopically and others by universal joints, are the integral pinions 5 and 6. The pinions 1 and 2, 3 and 4, and 5 and 6 are so located that motion is transmitted through one of each pair from the cone-shaft K to the shaft F. The pinions 1 and 2 and 5 and 6 are, as before stated, slidingly mounted on their respective shafts, so that either the larger or smaller pinion of each pair can be geared up with the smaller or larger pinion of the intermediate pair 3 and 4.

It is evident that by means of the cone and tumbler gear a variety of speeds corresponding in number to the number of gears in the cone can be transmitted to the shaft F and by changing the sizes of the pulleys between the cone-shaft and the driven shaft F that these changes can be multiplied.

At $4^a$, $4^b$, and $4^c$, Fig. 4, are shown diagrammatically the various changes in the combinations of speeds that may be attained by the shifting-gears. In Fig. $4^a$ power is transmitted from the large pinion 1 to small pinion 4 and from large pinion 3 to small pinion 6. In Fig. $4^b$ power is transmitted through small pinion 2 to larger pinion 3 and from the latter to smaller pinion 6, while in Fig. $4^c$ power is transmitted from smaller pinion 2 to larger pinion 3 and from smaller pinion 4 to larger pinion 5. One or all of these combinations can be used with each gear of the cone, thus providing three changes of speed for each gear of the cone.

In addition to the changeable gears intermediate the cone-shaft and shaft F the changes can be still further multiplied by employing step or cone pulleys on shafts B and H, as shown in dotted lines in Fig. 1. When cone-pulleys are employed on either the live-spindle and tumbler-shaft, a change in pulleys changes the speed of the tumbler-shaft. With this construction the change - speed mechanism is carried and supported by the removable plate G, thus dispensing with the necessity and incidental expense of providing the heavy and cumbersome frame with machined bearings for the several shafts.

In assembling the parts the plate G should first be secured in place and the shafts H and K passes into their bearings, but not necessarily all the way through. The cone is then passed through the door a and lifted to its position and slid and locked in its shaft, after which the tumbler-lever and sliding pinion should be secured on the shaft H.

By means of this system of gearing a large number of changes in speed can be imparted to shaft F and transmitted from the latter to the movable screws carried on the knee and the movable parts on the knee.

It is evident that many slight changes might be resorted to in the relative arrangement of parts herein shown and described without departing from the spirit and scope of my invention. Hence I would have it understood that I do not wish to confine myself to the exact construction of parts herein shown and described; but, Having fully described my invention, what I claim as new, and desire to secure by Letters Patent, is—

1. The combination with a live-spindle, and cone-pulley and a driving-pulley thereon, of a tumbler-shaft, a driven pulley thereon, a sliding gear on the tumbler-shaft, a tumbler-gear actuated by said sliding gear, a step or cone gear engaged by the tumbler-gear, a driven shaft and interchangeable gears between the cone-shaft and driven shaft.

2. The combination with a frame, a live-spindle mounted thereon and a step or cone pulley and a driving-pulley on said spindle, of a removable plate having projecting or extended sleeves or bearings, a shaft in each of said bearings, a step or cone gear on one shaft, a sliding gear on the other shaft, a tumbler-gear engaging the sliding gear and cone-gear, a driven shaft, interchangeable gears intermediate the cone-gear shaft and the driven shaft, and a driven pulley on the tumbler or sliding gear shaft.

3. The combination with a frame, a live-spindle mounted thereon, and a cone-pulley and a driving-pulley on said shaft, of a tumbler-shaft, a pulley and sliding gear thereon, a shaft, a step or cone gear secured on said shaft, a tumbler-gear connecting the sliding gear and the step or cone gear, a driven shaft, and gearing connecting the cone-gear shaft and the driven shaft.

4. The combination with a base or frame, a live-spindle mounted thereon, and a cone-pulley and a driving-pulley on said spindle, of a tumber-shaft, a pulley and sliding gear on said tumbler-shaft, a shaft, a step or cone gear on said shaft, a tumbler-gear connecting the step or cone gear and the sliding gear, a driven shaft and interchangeable gears between the shaft carrying the cone-gear and the driven shaft.

5. The combination with a base or frame, and a removable plate having two laterally-projecting sleeves or bearings, of a tumbler-shaft mounted in one of said bearings and supported wholly thereby, a sliding gear on said shaft, a shaft mounted in the other bearing, a step or cone gear carried by said shaft and recessed to overlap the projecting bearing, a tumbler-gear connecting the sliding and cone gears, a driven shaft, and interchangeable gears between the driven shaft and cone-gear shaft.

In testimony whereof I have signed this specification in the presence of two subscribing witnesses.

WENDELL P. NORTON.

Witnesses:
CHAPMAN W. FOWLER,
A. W. BRIGHT.